(12) United States Patent
Ban et al.

(10) Patent No.: US 12,333,676 B2
(45) Date of Patent: Jun. 17, 2025

(54) IMAGE PROCESSING APPARATUS AND OPERATING METHOD THEREOF

(71) Applicant: Samsung Electronics Co., Ltd., Suwon-si (KR)

(72) Inventors: Daehyun Ban, Suwon-si (KR); Yongsung Kim, Suwon-si (KR); Dongwan Lee, Suwon-si (KR); Juyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 17/745,192

(22) Filed: May 16, 2022

(65) Prior Publication Data

US 2022/0375032 A1 Nov. 24, 2022

Related U.S. Application Data

(63) Continuation of application No. PCT/KR2022/006829, filed on May 12, 2022.

(30) Foreign Application Priority Data

May 21, 2021 (KR) .......................... 10-2021-0065663
Apr. 6, 2022 (KR) .......................... 10-2022-0043063

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 5/30* (2013.01);
(Continued)

(58) Field of Classification Search
CPC ....... G06T 3/4046; G06T 3/4053; G06T 5/30; G06T 5/50; G06T 2207/20081; G06T 2207/20084; G06V 10/7715
See application file for complete search history.

(56) References Cited

U.S. PATENT DOCUMENTS 9,894,372 B2  2/2018  Puri et al.
10,929,977 B2  2/2021  Wang et al.
(Continued)

FOREIGN PATENT DOCUMENTS

KR  10-2020-0034352 A   3/2020
KR     10-2092205 B1   3/2020
KR     10-2169242 B1  10/2020

OTHER PUBLICATIONS

X. Gao, L. Zhang and X. Mou, "Single Image Super-Resolution Using Dual-Branch Convolutional Neural Network," in IEEE Access, vol. 7, pp. 15767-15778, 2019, doi: 10.1109/ACCESS.2018.2889760. (Year: 2019).*

(Continued)

*Primary Examiner* — Matthew C Bella
*Assistant Examiner* — Janice E. Vaz
(74) *Attorney, Agent, or Firm* — Jefferson IP Law, LLP

(57) ABSTRACT

A method of operating an image processing apparatus is provided. The method includes generating a first feature map by performing a convolution operation between a first image and a first kernel group, generating a second feature map by performing a convolution operation between the first image and a second kernel group, generating a first combination map based on the first feature map, generating a second combination map based on the first feature map and the second feature map, generating a second image based on the first combination map and the second combination map, and generating a reconstructed image of the first image, based on the second image and the first image, and generating a (Continued)

high-resolution image of the first image by inputting the reconstructed image to an upscaling model.

20 Claims, 12 Drawing Sheets

(51) Int. Cl.
  *G06T 5/30* (2006.01)
  *G06T 5/50* (2006.01)
  *G06V 10/77* (2022.01)
(52) U.S. Cl.
  CPC ............ *G06T 5/50* (2013.01); *G06V 10/7715* (2022.01); *G06T 2207/20081* (2013.01); *G06T 2207/20084* (2013.01)

(56) References Cited

U.S. PATENT DOCUMENTS

| | | | |
|---|---|---|---|
| 11,244,028 | B2 | 2/2022 | Song et al. |
| 2019/0164290 | A1 | 5/2019 | Wang et al. |
| 2020/0133989 | A1 | 4/2020 | Song et al. |
| 2020/0401889 | A1 | 12/2020 | Lee et al. |
| 2021/0125338 | A1 | 4/2021 | Zhang |
| 2021/0142144 | A1 | 5/2021 | Han |
| 2022/0019895 | A1 | 1/2022 | Son et al. |
| 2022/0284547 | A1* | 9/2022 | Wang ................... G06T 3/4053 |
| 2023/0139962 | A1* | 5/2023 | Xiang ................... G06T 3/4046 382/275 |

OTHER PUBLICATIONS

Bashir, Syed Muhammad Arsalan et al. "A Comprehensive Review of Deep Learning-based Single Image Super-Resolution". arXiv:2102.09351v1 pp. 1-35, Feb. 2021 (Year: 2021).*
F. Li, H. Bai and Y. Zhao, "FilterNet: Adaptive Information Filtering Network for Accurate and Fast Image Super-Resolution," in IEEE Transactions on Circuits and Systems for Video Technology, vol. 30, No. 6, pp. 1511-1523, Jun. 2020, doi: 10.1109/TCSVT.2019.2906428. (Year: 2020).*
Syed Muhammad Arsalan Bashir et al., A Comprehensive Review of Deep Learning-based Single Image Super-resolution, arXiv:2102.09351v1, p. 1-35, Feb. 28, 2021.
International Search Report dated Aug. 10, 2022, issued in International Application No. PCT/KR2022/006829.
Bee Lim et al., Enhanced Deep Residual Networks for Single Image Super-Resolution, arXiv:1707.02921v1 [cs.CV], Jul. 10, 2017.
Jiwon Kim et al., Accurate Image Super-Resolution Using Very Deep Convolutional Networks, arXiv:1511.04587v2 [cs.CV], Nov. 11, 2016.
Dan Jiawang et al: "Scale adaptive and lightweight super-resolution with a selective hierarchical residual network", Mar. 5, 2021, XP058655603.
Abdul Muqeet et al: "Hybrid Residual Attention Network for Single Image Super Resolution", Jul. 12, 2019, XP081441143.
Huang Zehao et al: "Image super-resolution via deep dilated convolutional networks", Sep. 17, 2019, XP033322716.
Extended European Search Report dated Jul. 3, 2024, issued in European Patent Application No. 22804901.1.

* cited by examiner

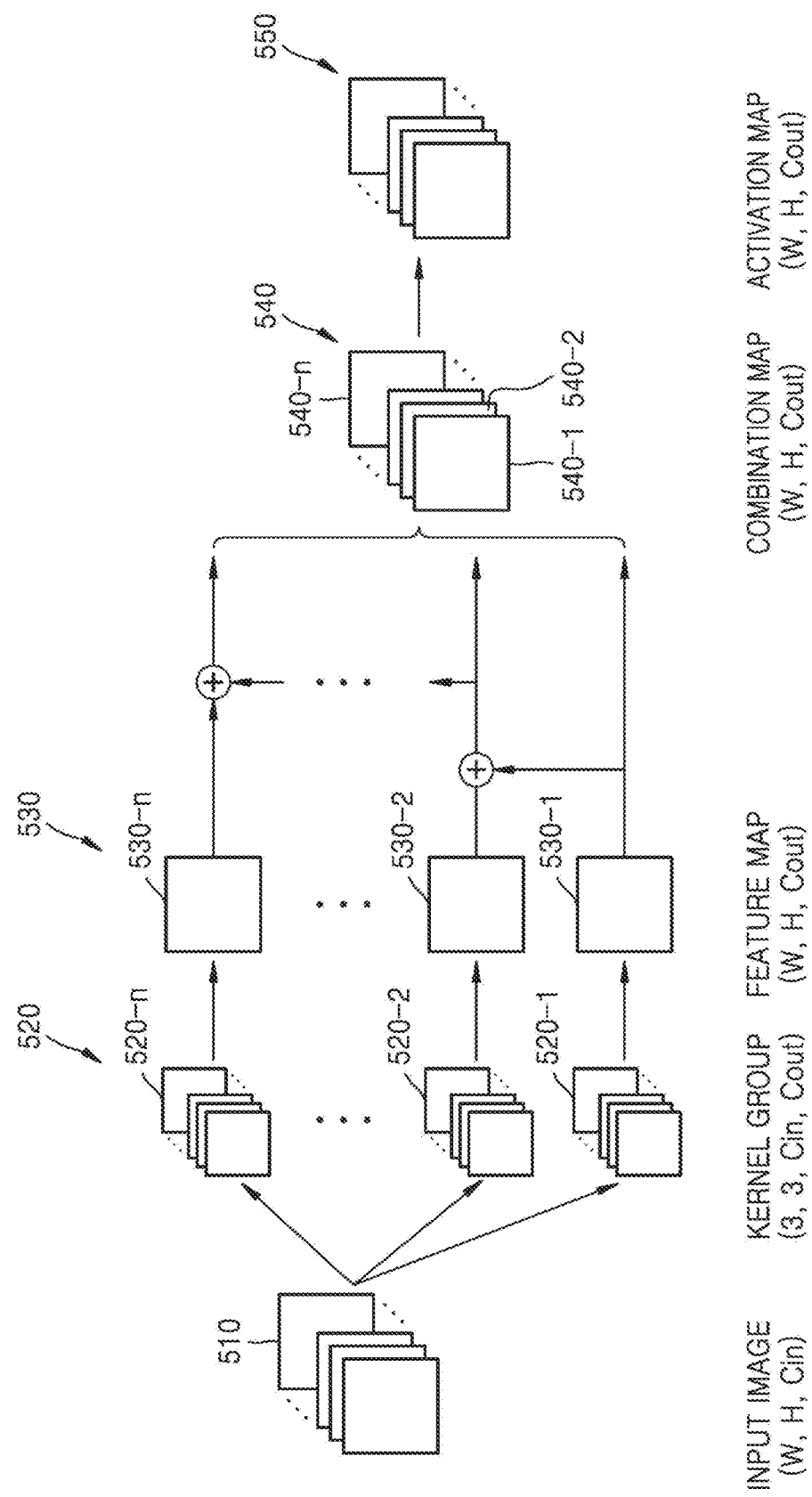

IMAGE PROCESSING APPARATUS AND OPERATING METHOD THEREOF

CROSS-REFERENCE TO RELATED APPLICATION(S)

This application is a continuation application, claiming priority under § 365(c), of an International application No. PCT/KR2022/006829, filed on May 12, 2022, which is based on and claims the benefit of a Korean patent application number 10-2021-0065663, filed on May 21, 2021, in the Korean Intellectual Property Office, and of a Korean patent application number 10-2022-0043063, filed on Apr. 6, 2022, in the Korean Intellectual Property Office, the disclosure of each of which is incorporated by reference herein in its entirety.

TECHNICAL FIELD

The disclosure relates to an image processing apparatus that improves the quality of an image by using a neural network, and a method of operating the image processing apparatus. More particularly, the disclosure relates to an image processing apparatus capable of performing super-resolution image processing for generating a high-resolution image of an original image, by using a convolutional neural network (CNN), and a method of operating the image processing apparatus.

BACKGROUND ART

As data traffic increases exponentially with the development of computer technology, artificial intelligence (AI) has become an important trend that leads future innovation. Because AI is a way of emulating human thinking, AI may be infinitely applied to all industries in practice. Representative AI techniques may include pattern recognition, machine learning, expert systems, neural networks, natural language processing, or the like.

A neural network models the characteristics of human biological neurons by mathematical expressions and uses an algorithm of emulating the ability of learning that humans have. The neural network may generate mapping between input data and output data through this algorithm, and the ability to generate, such mapping may be expressed as a learning ability of the neural network. Moreover, the neural network has a generalization ability to generate correct output data with respect to input data that has not been used for learning, based on a learning result.

By using a deep neural network (e.g., a deep-layer convolutional neural network (CNN)), image processing, such as super resolution for generating a high-resolution image, may be performed.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an image processing apparatus capable of performing super-resolution image processing for generating a high-resolution image of an original image, by using a convolutional neural network (CNN), and a method of operating the image processing apparatus.

Additional aspects will be set forth in part in the description which follows and, in part, will be apparent from the description, or may be learned by practice of the presented embodiments.

Solution to Problem

In accordance with an aspect of the disclosure, a method of operating an image processing apparatus is provided. The method includes generating a first feature map by performing a convolution operation between a first image and a first kernel group, generating a second feature map by performing a convolution operation between the first image and a second kernel group, generating a first combination map based on the first feature map, generating a second combination map based on the first feature map and the second feature map, generating a second image based on the first combination map and the second combination map, and generating a reconstructed image of the first image, based on the second image and the first image, and generating a high-resolution image of the first image by inputting the reconstructed image to an upscaling model, in which a size of at least one kernel included in the first kernel group and a size of at least one kernel included in the second kernel group are equal to each other, and a dilation rate of the second kernel group is greater than a dilation rate of the first kernel group.

According to an embodiment of the disclosure, a size of at least one kernel included in the first kernel group and a size of at least one kernel included in the second kernel group may be each 3×3, and the number of kernels included in the first kernel group may be equal to the number of kernels included in the second kernel group.

According to an embodiment of the disclosure, the dilation rate of the first kernel group may be 1, and the dilation rate of the second kernel group may be 2.

According to an embodiment of the disclosure, the first combination map may be the same as the first feature map, and the second combination map may be generated by weighted-summing the first feature map and the second feature map.

According to an embodiment of the disclosure, the method may include generating a third feature map by performing a convolution operation between the first image and a third kernel group and generating a third combination map based on the second feature map and the third feature map, in which the generating of the second image includes generating the second image based on the first combination map, the second combination map, and the third combination map.

According to an embodiment of the disclosure, the second image may be generated by inputting the first combination map and the second combination map to an activation function, and the activation function may include at least one of a rectified linear unit (ReLU) function, a sigmoid function, a Tanh function, or an exponential linear unit (ELU) function.

According to an embodiment of the disclosure, the generating of the second image may include generating a first activation map based on the first combination map and the second combination map, generating a fourth feature map by performing a convolution operation between the first activation map and a fourth kernel group, generating a fifth feature map by performing a convolution operation between the first activation map and a fifth kernel group, generating a fourth combination map based on the fourth feature map, generating a fifth combination map based on the fourth feature map and the fifth feature map, and generating the second image based on the fourth combination map and the fifth combination map, in which a size of at least one kernel included in the fourth kernel group and a size of at least one kernel included in the fifth kernel group are equal to each other, and a dilation rate of the fifth kernel group is greater than a dilation rate of the fourth kernel group.

According to an embodiment of the disclosure, the second image may be generated by inputting the fourth combination map and the fifth combination map to an activation function, and the activation function may include at least one of an ReLU function, a sigmoid function, a Tanh function, or an ELU function.

According to an embodiment of the disclosure, the generating of the high-resolution image of the first image may include identifying an upscaling coefficient of the first image and generating the high-resolution image of the first image by inputting the reconstructed image of the first image to the upscaling model corresponding to the identified upscaling coefficient among a plurality of upscaling models.

According to an embodiment of the disclosure, at least one of the first kernel group, the second kernel group, or the upscaling model may be trained using a training data set including low-resolution images and high-resolution images respectively corresponding to the low-resolution images.

In accordance with another aspect of the disclosure, an image processing apparatus is provided. The image processing apparatus includes a memory storing one or more instructions, and a processor configured to execute the one or more instructions stored in the memory, in which the processor may be further configured to generate a first feature map by performing a convolution operation between a first image and a first kernel group, generate a second feature map by performing a convolution operation between the first image and a second kernel group, generate a first combination map based on the first feature map, generate a second combination map based on the first feature map and the second feature map, generate a second image based on the first combination map and the second combination map, and generate a reconstructed image of the first image, based on the second image and the first image, and generate a high-resolution image of the first image by inputting the reconstructed image to an up scaling model, in which a size of at least one kernel included in the first kernel group and a size of at least one kernel included in the second kernel group are equal to each other, and a dilation rate of the second kernel group is greater than a dilation rate of the first kernel group.

In accordance with another aspect of the disclosure, a computer-readable recording medium having recorded thereon a program for executing the method on a computer is provided.

Advantageous Effects of Disclosure

An method of operating an image processing apparatus, according to an embodiment of the disclosure, may generate a high-resolution image based on a generated feature map, by performing a convolution operation of kernel groups having different dilation rates.

The method of operating the image processing apparatus according to an embodiment of the disclosure may perform super resolution for generating a high-resolution image of an input image by using a convolutional neural network (CNN).

The method of operating the image processing apparatus according to an embodiment of the disclosure may perform super resolution in real time through a small amount of computations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5B is a diagram illustrating an image processing network according to an embodiment of the disclosure;

Throughout the drawings, it should be noted that like reference numbers are used to depict the same or similar elements, features, and structures.

MODE OF DISCLOSURE

Figure 1:
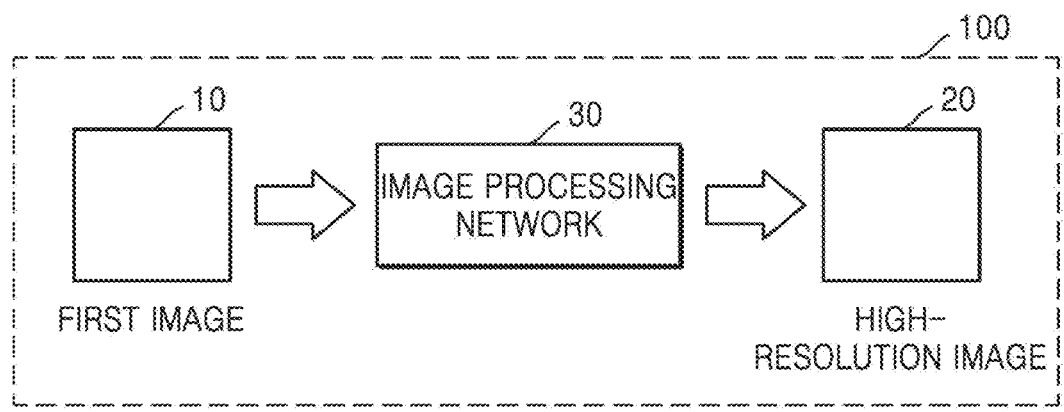
FIG. 1 is a diagram illustrating an image processing operation, performed by an image processing apparatus, by using an image processing network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Prior to a specific description of the disclosure, the terms used herein may be defined or understood as below.

In the specification, a "feature map" may refer to a result obtained by performing a convolution operation between a first image or an input image and a kernel group. For example, a first feature map may be generated by performing a convolution operation between the first image or the input image and a first kernel group, and a second feature map may be generated by performing a convolution operation between the first image or the input image and a second kernel group.

In the specification, a "combination map" may refer to a result generated based on at least one feature map. For example, a first combination map may be generated identically to the first feature map, and a second combination map may be generated by summing the first feature map with the second feature map.

In the specification, an "activation map" may be a result generated by inputting the combination map to an activation function. For example, the activation map may be generated by inputting the combination map to an activation function, such as a sigmoid function, a Tanh function, a rectified linear unit (ReLU) function, a leaky ReLU function, an exponential linear unit (ELU) function, or the like.

In the specification, a "dilation rate" may mean an interval between kernels when a dilated convolution is performed. The interval between kernels may mean a minimum interval between pixels of an input image to which elements of one kernel are applied. When the convolution operation is performed between an input image and kernels having a dilation rate of 2, it may be understood that the convolution operation is performed between the input image and dilated kernels. The convolution operation using the dilated kernels may be expressed as a dilated convolution operation.

In the specification, a "kernel group" may mean a group of at least one kernel having the same dilation rate. For example, the kernel group may be classified into a first kernel group and a second kernel group according to a dilation rate, and the first kernel group and the second kernel group may be groups of kernels having different dilation rates. For example, the first kernel group may mean a group of kernels having a dilation rate of 1, and the second kernel group may mean a group of kernels having a dilation rate of 2. The kernel group, without being limited thereto, may be classified into "the first kernel group, the second kernel group, . . . , and an $n^{th}$ kernel group", or the like. According to an embodiment of the disclosure, the number of kernels included in each classified kernel group may be identical. For example, the first kernel group, the second kernel group, . . . , and the $n^{th}$ kernel group all may include 8 kernels.

FIG. 1 is a diagram illustrating an image processing operation, performed by an image processing apparatus, by using an image processing network, according to an embodiment of the disclosure.

Referring to FIG. 1, an image processing network 30 according to an embodiment of the disclosure may receive a first image 10 and process the first image 10 to generate a high-resolution image 20. The first image 10 may be an image including noise or a low-resolution image. An image processing apparatus 100 may generate a high-resolution image 20 by performing denoising that removes a noise component while maintaining a detailed region like an edge and a texture of the first image 10, by using the image processing network 30. The high-resolution image 20 may have a higher resolution and an improved quality when compared to the first image 10.

Image processing performed by an image processing network 30 according to an embodiment of the disclosure will be described below with reference to the accompanying drawings.

Figure 2:
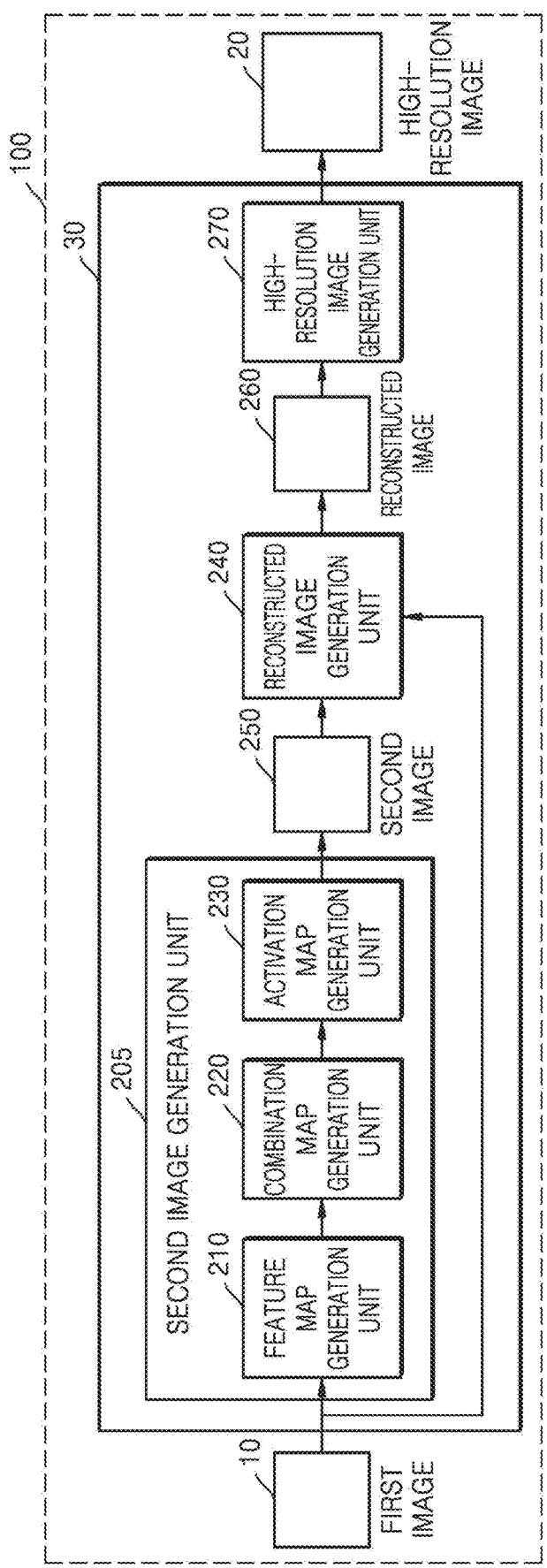
FIG. 2 is a diagram illustrating an image processing network according to an embodiment of the disclosure.

FIG. 2 is a diagram illustrating an image processing network according to an embodiment of the disclosure.

Referring to FIG. 2, the image processing network 30 according to an embodiment of the disclosure may include a second image generation unit 205, a reconstructed image generation unit 240, and a high-resolution image generation unit 270. According to an embodiment of the disclosure, the second image generation unit 205 may include a feature map generation unit 210, a combination map generation unit 220, and an activation map generation unit 230. It is shown in FIG. 2 that the second image generation unit 205 includes one feature map generation unit 210, one combination map generation unit 220, and one activation map generation unit 230 according to an embodiment of the disclosure, but the disclosure is not limited thereto. A method, performed by the second image generation unit 205, of generating a second image 250 with the first image 10 will be described with reference to FIG. 4.

The image processing network 30 according to an embodiment of the disclosure may include a structure that receives the first image 10 to output the high-resolution image 20.

The feature map generation unit 210 according to an embodiment of the disclosure may generate a feature map by performing a convolution operation between the first image 10 and a kernel group. According to an embodiment of the disclosure, a kernel may be classified depending on a dilation rate. For example, the first kernel group may mean a group of kernels having a dilation rate of 1, and the second kernel group may mean a group of kernels having a dilation rate of 2. According to an embodiment of the disclosure, when the dilation rate of kernels included in the first kernel group is 1, it may be expressed that the dilation rate of the first kernel group is 1. When the feature map generation unit 210 performs the convolution operation with kernels having a dilation rate of 2 or more, it may mean that the feature map generation unit 210 performs a dilated convolution operation. According to an embodiment of the disclosure, the feature map generation unit 210 may generate a plurality of feature maps corresponding to different dilation rates, by performing a convolution operation between the first image 10 and a kernel group. For example, the first feature map may be generated by performing the convolution operation between the first image 10 and the first kernel group, and the second feature map may be generated by performing the convolution operation between the first image 10 and the second kernel group. When the convolution operation is performed using kernels having a greater dilation rate, a feature in a broader range may be extracted with the same amount of computations. A process in which the feature map generation unit 210 performs the convolution operation between the first image 10 and a kernel group will be described with reference to FIGS. 5A, 5B, 6, and 7.

The combination map generation unit 220 according to an embodiment of the disclosure may generate a combination map by weighted summing some of input feature maps that are output from the feature map generation unit 210. For example, when the first feature map and the second feature map are respectively generated by the convolution operation between the first image 10 and the first kernel group having a dilation rate of 1 and the convolution operation between the first image 10 and the second kernel group having a dilation rate of 2, the combination map generation unit 220 may generate the first combination map identically to the first feature map and generate the second combination map by summing the first feature map with the second feature map. When the convolution operation using the kernel group having a dilation rate of 1 and the convolution operation using the kernel group having a dilation rate of 2 or more are compared to each other, the convolution operation having a dilation rate of 2 or more is applied to a broader range in an input image, such that a feature in a broader range than the convolution operation using the kernel group having a dilation rate of 1 may be extracted. For example, with the same amount of computations as the amount of computations of the convolution operation using the kernel group having a dilation rate of 1, a feature in a broader range in the input image may be extracted by using the kernel group having a dilation rate of 2 or more. However, some of features in a broader range are extracted when compared to features extracted from the input image by the convolution operation using the kernel group having a dilation rate of 1, such that the extracted features may be inaccurate. However, by generating a combination map from feature maps obtained by convolution operations with kernel groups having different dilation rates, such drawbacks may be compensated for. A process in which the combination map generation unit 220 generates a combination map from a feature map will be described with reference to FIGS. 5A and 5B.

The activation map generation unit 230 according to an embodiment of the disclosure may generate an activation map by applying a combination map generated by the combination map generation unit 220 to an activation function. According to an embodiment of the disclosure, the activation function assigns non-linear characteristics to feature information, and may include, but is not limited to, a sigmoid function, a Tanh function, an ReLU function, a leaky ReLU function, an ELU function, or the like. According to an embodiment of the disclosure, the image processing network 30 may repeat a procedure to the feature map generation unit 210, the combination map generation unit 220, and the activation map generation unit 230 with an activation map that is output from the activation map generation unit 230, as an input back to the feature map generation unit 210. The second image 250 may be a final activation map generated by at least one repetition. According to an embodiment of the disclosure, the second image 250 may be a residual image between the first image and a reconstructed image obtained by improving a quality of the first image.

The reconstructed image generation unit 240 according to an embodiment of the disclosure may generate a reconstructed image 260 based on the first image 10 and the second image 250. The reconstructed image 260 may be an image that has the same size as the first image 10 and has a quality improved by a series of processes. According to an embodiment of the disclosure, the reconstructed image generation unit 240 may generate the reconstructed image 260 by summing the first image 10 with the second image 250.

The high-resolution image generation unit 270 according to an embodiment of the disclosure may obtain the high-resolution image 20 by inputting the reconstructed image 260 to an upscaling model. For example, when the reconstructed image 260 has a width of W and a height of H, the high-resolution image generation unit 270 may generate the high-resolution image 20 having a width of 2W and a height of 2H by inputting the reconstructed image 260 to a twice (×2) upscaling model. However, the high-resolution image generation unit 270 may also generate the high-resolution image 20 having the same size as the reconstructed image 260, without being limited thereto. According to an embodiment of the disclosure, the high-resolution image generation unit 270 may be implemented with a sub-pixel convolution.

According to an embodiment of the disclosure, the image processing apparatus 100 may generate the high-resolution image 20 with a small amount of computations. For example, a related art uses increasing the number of convolutional layers of the image processing network 30 to generate the high-resolution image 20. The image processing network 30 having an increased number of convolutional layers may increase the number of parameters, increasing the amount of computations. To generate the high-resolution image 20 in real time, the number of parameters of the image processing network 30 need to be reduced. By dividing kernels of the image processing network 30 into a plurality of groups and performing convolution operations by applying different dilation rates to the plurality of kernel groups, a high-resolution image may be generated with a small number of convolutional layers. For example, when the dilation rate of the second kernel group is 2 and the dilation rate of the first kernel group is 1, a feature of a 3×3 region of an input image may be extracted using the first kernel group and a feature of a 5×5 region of the input image may be extracted using the second kernel group. The image processing apparatus 100 may generate the high-resolution image 20 using less parameters by extracting features of various regions through a small amount of computations. By reducing the number of convolutional layers of the image processing network 30, the number of parameters included in the image processing network 30 may be reduced. The image processing apparatus 100 may generate a high-resolution image in real time by using the image processing network 30 having a small number of parameters.

The method of generating a high-resolution image will be described with reference to FIG. 3.

Figure 3:
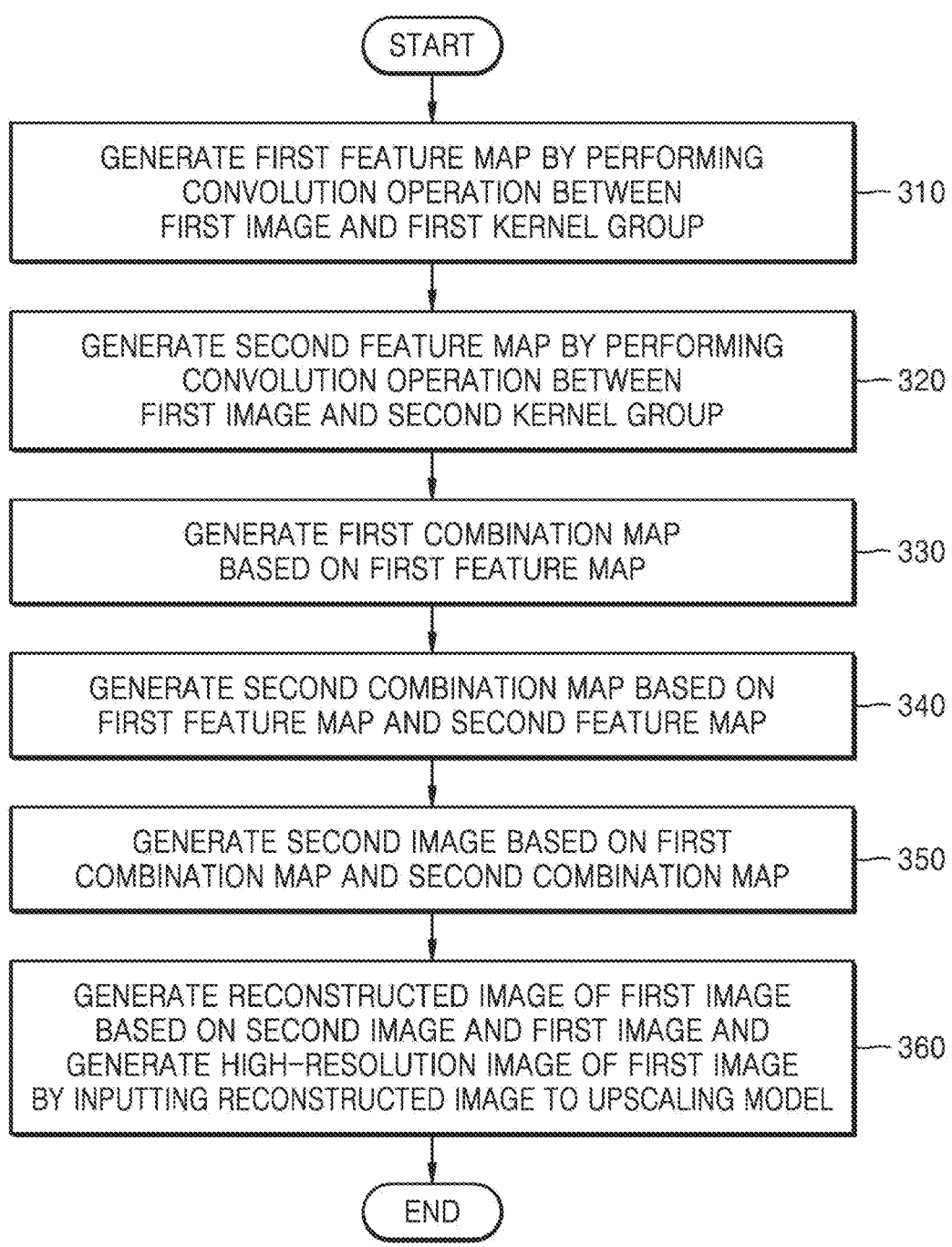
FIG. 3 is a flowchart of a method of generating a high-resolution image, according to an embodiment of the disclosure.

FIG. 3 is a flowchart of a method of generating a high-resolution image, according to an embodiment of the disclosure.

Referring to FIG. 3, in operation 310, the image processing apparatus 100 according to an embodiment of the disclosure may generate a first feature map by performing a convolution operation between a first image and a first kernel group. According to an embodiment of the disclosure, the first kernel group may be a group of at least one kernel having the same dilation rate. According to an embodiment of the disclosure, the first kernel group may have a dilation rate of 1.

In operation 320, the image processing apparatus 100 according to an embodiment of the disclosure may generate a second feature map by performing a convolution operation between the first image and a second kernel group. According to an embodiment of the disclosure, the second kernel group may be a group of at least one kernel having the same dilation rate. According to an embodiment of the disclosure, the dilation rate of the second kernel group may be greater than the dilation rate of the first kernel group. For example, the dilation rate of the first kernel group may be 1, and the dilation rate of the second kernel group may be 2. According to an embodiment of the disclosure, a size of the at least one kernel included in the second kernel group may be the same as a size of the at least one kernel included in the first kernel group. For example, the size of the at least one kernel included in the second kernel group and the size of the at least one kernel included in the first kernel group may be 3×3. According to an embodiment of the disclosure, the number of kernels included in the first kernel group and the number of kernels included in the second kernel may be equal to each other. For example, when C/k kernels are included in the first kernel group, C/k kernels may be identically included in the second kernel group.

According to an embodiment of the disclosure, a third kernel group that is a group of kernels having a greater dilation rate than the dilation rate of the second kernel group may be further included. For example, the dilation rate of the first kernel group may be 1, the dilation rate of the second kernel group may be 2, and the dilation rate of the third kernel group may be 4. According to an embodiment of the disclosure, the dilation rate may be determined to be $2^k$ (k is an integer greater than or equal to 0).

In operation 330, the image processing apparatus 100 according to an embodiment of the disclosure may generate a first combination map based on a first feature map. According to an embodiment of the disclosure, the first combination map may be the same as the first feature map.

In operation 340, the image processing apparatus 100 according to an embodiment of the disclosure may generate a second combination map based on the first feature map and a second feature map. According to an embodiment of the disclosure, the second combination map may be generated by summing the first feature map with the second feature map. For example, a parameter value of the second combination map may be obtained by summing corresponding parameter values in the first feature map and the second feature map. According to an embodiment of the disclosure, the second combination map may be generated by weighted-summing the first feature map and the second feature map. For example, the second combination map may be generated by summing the product of a first weight value and the first feature map and the product of a second weight value and the second feature map.

According to an embodiment of the disclosure, when a third feature map exists, an operation of generating a third combination map may be further included. For example, the third combination map may be generated by summing the second combination map with the third feature map. Without being limited to the third combination map, when more feature maps exist, an operation of generating a combination map corresponding to a feature map may be further included.

In operation 350, the image processing apparatus 100 according to an embodiment of the disclosure may generate a second image based on the first combination map and the second combination map. According to an embodiment of the disclosure, an activation map may be generated by applying the first combination map and the second combination map to an activation function. According to an embodiment of the disclosure, the second image may be a generated activation map.

According to an embodiment of the disclosure, the image processing apparatus 100 may generate the third feature map and a fourth feature map by performing a convolution operation between an activation map and the third kernel group and a convolution operation between the activation map and a fourth kernel group. According to an embodiment of the disclosure, the image processing apparatus 100 may generate the third combination map and a fourth combination map, based on the generated third feature map and fourth feature map. According to an embodiment of the disclosure, the image processing apparatus 100 may generate a second image based on the generated third combination map and fourth combination map. According to an embodiment of the disclosure, a method, performed by the image processing apparatus 100, of generating the second image will be described with reference to FIG. 4.

In operation 360, the image processing apparatus 100 according to an embodiment of the disclosure may generate a reconstructed image of the first image, based on the second image and the first image, and generate a high-resolution image of the first image by inputting the reconstructed image to an upscaling model. According to an embodiment of the disclosure, the reconstructed image may be generated by summing the first image with the second image. The reconstructed image may be an image having a quality improved when compared to the first image. According to an embodiment of the disclosure, the upscaling model may include a plurality of upscaling models having different upscaling coefficients. A method of generating a high-resolution image by inputting the reconstructed image to the upscaling model will be described with reference to FIG. 8.

Figure 4:
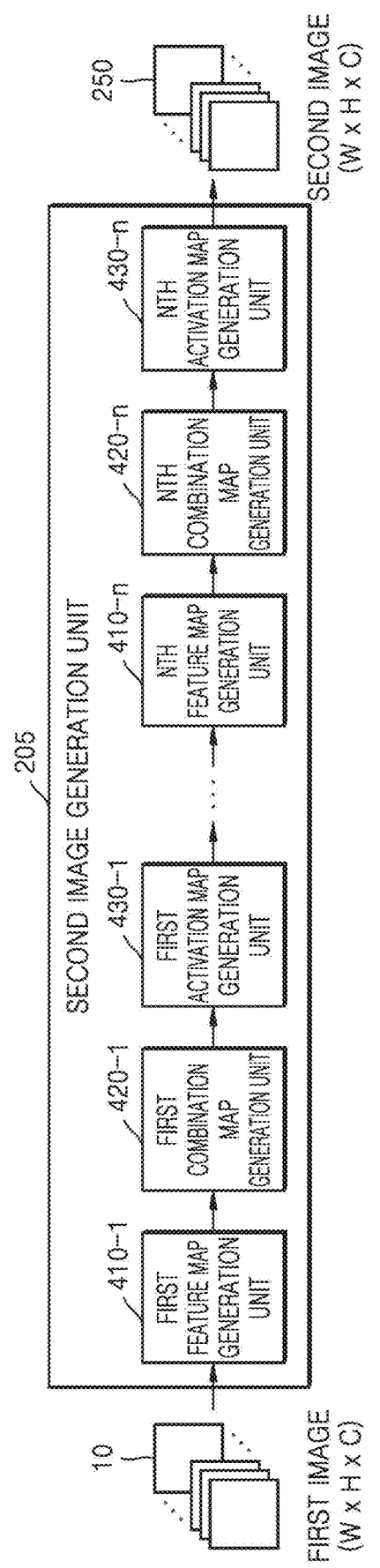
FIG. 4 is a diagram illustrating an image processing network according to an embodiment of the disclosure.

FIG. 4 is a diagram illustrating an image processing network according to an embodiment of the disclosure.

Referring to FIGS. 2 and 4, according to an embodiment of the disclosure, the image processing apparatus 100 may generate the second image 250 with the first image 10 as an input to the second image generation unit 205. The second image generation unit 205 of FIG. 2 includes one feature map generation unit 210, one combination map generation unit 220, and one activation map generation unit 230, without being limited thereto, and as shown in FIG. 4, the image processing apparatus 100 may include a plurality of feature map generation units 410-1, . . . , 410-n, a plurality of combination map generation units 420-1, . . . , 420-n, and a plurality of activation map generation units 430-1, . . . , 430-n.

According to an embodiment of the disclosure, the image processing apparatus 100 may generate the second image 250 from the first image 10 by repeating the feature map generation unit 210, the combination map generation unit 220, and the activation map generation unit 230. For example, assuming that the feature map generation unit, the combination map generation unit, and the activation map generation unit are regarded as one layer, the second image may be generated through n layers. With a method of generating the second image through a plurality of layers and generating a high-resolution image based on the generated second image according to an embodiment of the disclosure, the amount of computations may be reduced. This will be described with reference to FIG. 10.

According to an embodiment of the disclosure, the first image 10 may generate the first activation map through the first feature map generation unit 410-1, the first combination map generation unit 420-1, and the first activation map generation unit 430-1. The first activation map may be an input to a second feature map generation unit (not shown). The first activation map may generate a second activation map through a second feature map generation unit (not shown), a second combination map generation unit (not shown), and a second activation map generation unit (not shown). According to an embodiment of the disclosure, by repeating the feature map generation units 410-1, . . . , 410-*n*, the combination map generation units 420-1, . . . , 420-*n*, and the activation map generation units 430-1, . . . , 430-*n* *n* times with the first image as a first input, an $n^{th}$ activation map may be generated. The second image may be generated identically to the $n^{th}$ activation map.

According to an embodiment of the disclosure, when the first image has a width of W, a height of H, and a channel of 3, the first image may be expressed as (W, H, 3). According to an embodiment of the disclosure, a kernel group of the first feature map generation unit 410-1 may be expressed as $(3, 3, 3, C_{out})$. In such an embodiment of the disclosure, the first activation map may be expressed as (W, H, $C_{out}$). According to an embodiment of the disclosure, $C_{out}$ may be various numbers. For example, $C_{out}$ may be one of 16, 32, 64, and 128. According to an embodiment of the disclosure, $C_{out}$ of activation maps may be identical and at least some thereof may be different.

In an embodiment of the disclosure, each kernel group of each of the feature map generation units 410-1, . . . , 410-*n* may include a group of a plurality of kernels having the same dilation rate. For example, a kernel group of the first feature map generation unit 410-1 may include a first kernel group having a dilation rate of 1, a second kernel group having a dilation rate of 2, or the like. According to an embodiment of the disclosure, a kernel group having the same dilation rate may include the same number of kernels. For example, when the kernel group of the first feature map generation unit 410-1 is $(3, 3, 3, C_{out})$, each of the first kernel group, the second kernel group, . . . , and a $k^{th}$ kernel group may be expressed as $(3, 3, 3, C_{out}/k)$. Herein, $C_{out}/k$ may mean the number of kernels included in each kernel group.

According to an embodiment of the disclosure, $C_{out}$ of the $n^{th}$ feature map generation unit 410-*n* has to be the same as a channel of the second image 250. For example, when the second image 250 is (W, H, 3), $C_{out}$ of the $n^{th}$ feature map may be 3.

A method, performed by the image processing apparatus 100, of generating an activation map from an input image through the feature map generation units 410-1, . . . , 410-*n*, the combination map generation units 420-1, . . . , 420-*n*, and the activation map generation units 430-1, . . . , 430-*n* according to an embodiment of the disclosure will be described with reference to FIGS. 5A and 5B.

Figure 5A:
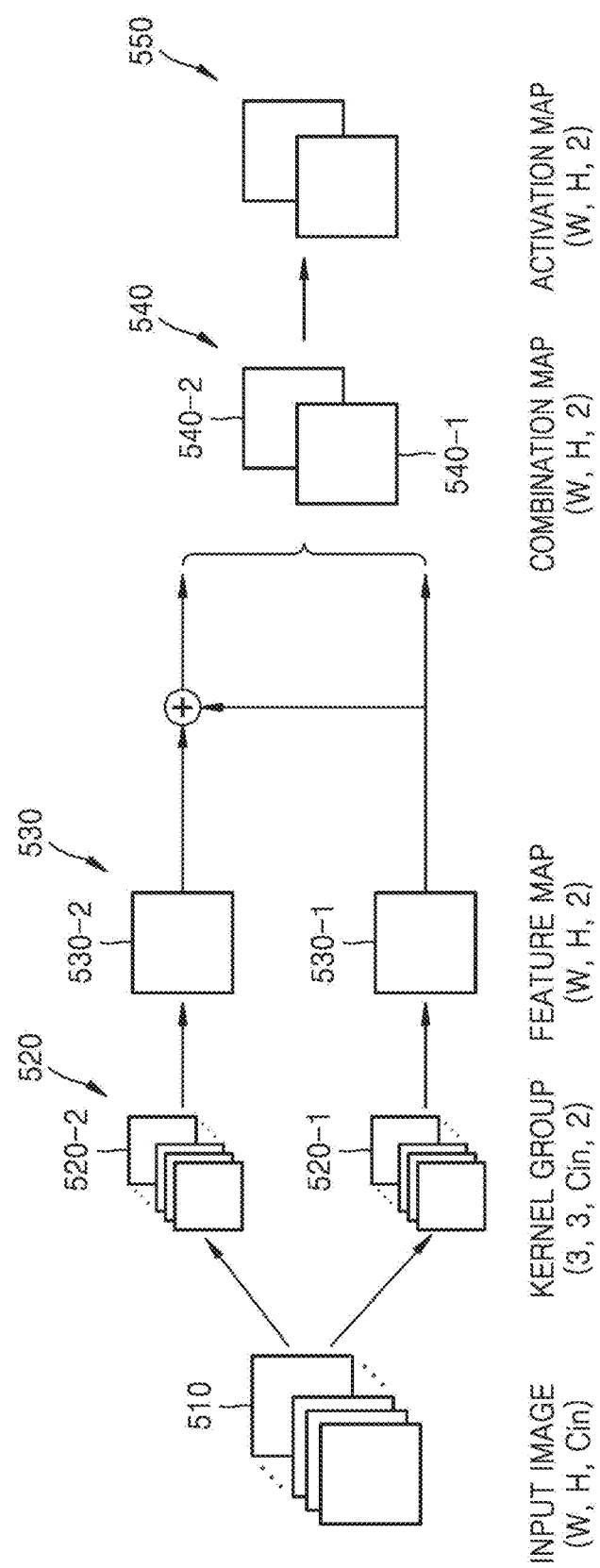
FIG. 5A is a diagram illustrating an image processing network according to an embodiment of the disclosure.

FIG. 5A is a diagram illustrating an image processing network according to an embodiment of the disclosure.

Referring to FIG. 5A, a method, performed by the image processing apparatus 100, of generating an activation map 550 by inputting an input image 510 through a feature map generation unit, a combination map generation unit, and an activation map generation unit, according to an embodiment of the disclosure, will be described. To simplify a description, the description will be made with reference to FIG. 5A based on $C_{out}$ of a kernel group 520 being 2. However, without being limited thereto, as shown in FIG. 5B, $C_{out}$ of the kernel group 520 may be various values as shown in FIG. 5B.

According to an embodiment of the disclosure, the image processing apparatus 100 may generate a feature map 530 by performing a convolution operation between the input image 510 and the kernel group 520. For example, by performing a convolution operation between the input image 510 and a first kernel group 520-1, a first feature map 530-1 may be generated. For example, by performing a convolution operation between the input image 510 and a second kernel group 520-2, a second feature map 530-2 may be generated. According to an embodiment of the disclosure, the feature map generation unit 210 of FIG. 2 may be a module for generating the feature map 530 based on a convolution operation between the input image 510 (e.g., the first image 10) and the kernel group 520.

According to an embodiment of the disclosure, a dilation rate of a second kernel group 520-2 may be greater than the dilation rate of the first kernel group 520-1. For example, the dilation rate of the second kernel group may be 2, and the dilation rate of the first kernel group may be 1. In this example, the first feature map 530-1 may extract a feature of a region having a size of 3×3, whereas the second feature map 530-2 may extract a feature of a region of a size of 5×5.

According to an embodiment of the disclosure, the image processing apparatus 100 may generate a combination map 540 based on the feature map 530. According to an embodiment of the disclosure, the combination map generation unit 220 of FIG. 2 may be a module for generating the combination map 540 based on the feature map 530.

According to an embodiment of the disclosure, the image processing apparatus 100 may use the first feature map 530-1 as a first combination map 540-1.

According to an embodiment of the disclosure, the image processing apparatus 100 may generate the second combination map 540-1 by summing the first feature map 530-1 and the second feature map 530-2. For example, when the dilation rate of the second kernel group is 2 and the dilation rate of the first kernel group is 1, the first feature map 530-1 may extract a feature of a 3×3 region of the input image 510 using all of 9 parameter values. On the other hand, the second feature map 530-2 may extract a feature from a 5×5 region of the input image 510 using 9 parameter values among 25 parameter values, such that the feature may be inaccurately extracted due to 16 parameter values that are not used. However, the second combination map 540-2 may be generated by summing the second feature map 530-2 with the first feature map 530-1 generated by the first kernel group 520-1 having a dilation rate of 1, such that the second combination map 540-2 may more accurately extract a feature than the second feature map 530-2.

According to an embodiment of the disclosure, the image processing apparatus 100 may generate an activation map 550 based on the combination map 540. According to an embodiment of the disclosure, the image processing apparatus 100 may generate the activation map 550 by applying the combination map 540 to an activation function. According to an embodiment of the disclosure, the activation map generation unit 230 of FIG. 2 may be a module for generating the activation map 550 based on the combination map 540.

FIG. 5B is a diagram illustrating an image processing network according to an embodiment of the disclosure.

Referring to FIG. 5B, a method, performed by the image processing apparatus 100, of generating the activation map 550 by inputting the input image 510 through a feature map generation unit, a combination map generation unit, and an activation map generation unit, according to an embodiment of the disclosure will be described. Unlike in FIG. 5A, a description will be made with reference to FIG. 5B based on $C_{out}$ of the kernel group 520 being n. According to an embodiment of the disclosure, $C_{out}$ may be one of 8, 16, 32, 64, and 128.

According to an embodiment of the disclosure, the image processing apparatus 100 may generate a feature map 530 by performing a convolution operation between the input image 510 and the kernel group 520. As described with reference to FIG. 5A, according to an embodiment of the disclosure, the image processing apparatus 100 may generate the first feature map 530-1, the second feature map 530-2, . . . , an $n^{th}$ feature map 530-n by performing convolution operations between the input image 510 and the first kernel group 520-1, the second kernel group 520-2, . . . , the $n^{th}$ kernel group 520-n. According to an embodiment of the disclosure, the feature map generation unit 210 of FIG. 2 may be a module for generating the feature map 530 based on a convolution operation between the input image 510 (e.g., the first image 10) and the kernel group 520.

According to an embodiment of the disclosure, a dilation rate of a $k^{th}$ kernel group (not shown) may be greater than a dilation rate of a $(k-1)^{th}$ kernel group (not shown). For example, a dilation rate of a fourth kernel group (not shown) may be 8, a dilation rate of a third kernel group (not shown) may be 4, the dilation rate of the second kernel group 520-2 may be 2, and the dilation rate of the first kernel group 520-1 may be 1. In such an example, the first feature map 530-1 may extract a feature of a region of a size of 3×3, the second feature map 530-2 may extract a feature of a region of a size of 4×4, the third feature map (not shown) may extract a feature of a region of a size of 9×9, and the fourth feature map (not shown) may extract a feature of a region of a size of 17×17. According to an embodiment of the disclosure, the dilation rate may be determined to be $2^k$ (k is an integer greater than or equal to 0).

According to an embodiment of the disclosure, the image processing apparatus 100 may generate a combination map 540 based on the feature map 530. According to an embodiment of the disclosure, the combination map generation unit 220 of FIG. 2 may be a module for generating the combination map 540 based on the feature map 530.

According to an embodiment of the disclosure, the image processing apparatus 100 may use the first feature map 530-1 as a first combination map 540-1.

According to an embodiment of the disclosure, the image processing apparatus 100 may generate a $k^{th}$ combination map by summing a $(k-1)^{th}$ combination map (not shown) and a $k^{th}$ feature map (not shown). For example, the image processing apparatus 100 may use a sum of the first feature map 530-1 and the second feature map 530-2 as the second combination map 540-2, a sum of the second combination map 540-2 and a third feature map (not shown) as a third combination map (not shown), and a sum of an $(n-1)^{th}$ combination map (not shown) and an $n^{th}$ feature map 530-n as an $n^{th}$ combination map 540-n. The $n^{th}$ combination map 540-n may collectively include features of the first feature map 530-1 to the $n^{th}$ feature map 530-n.

According to an embodiment of the disclosure, the image processing apparatus 100 may include some missing features depending on a dilation rate by using a sum of the $(k-1)^{th}$ combination map and the $k^{th}$ feature map as the $k^{th}$ combination map, thereby extracting a feature of a wider region of the input image 510 with a small amount of computations of operations of nine parameters.

According to an embodiment of the disclosure, the image processing apparatus 100 may generate an activation map 550 based on the combination map 540. According to an embodiment of the disclosure, the image processing apparatus 100 may generate the activation map 550 by applying the combination map 540 to an activation function. According to an embodiment of the disclosure, the activation map generation unit 230 of FIG. 2 may be a module for generating the activation map 550 based on the combination map 540.

Figure 6:
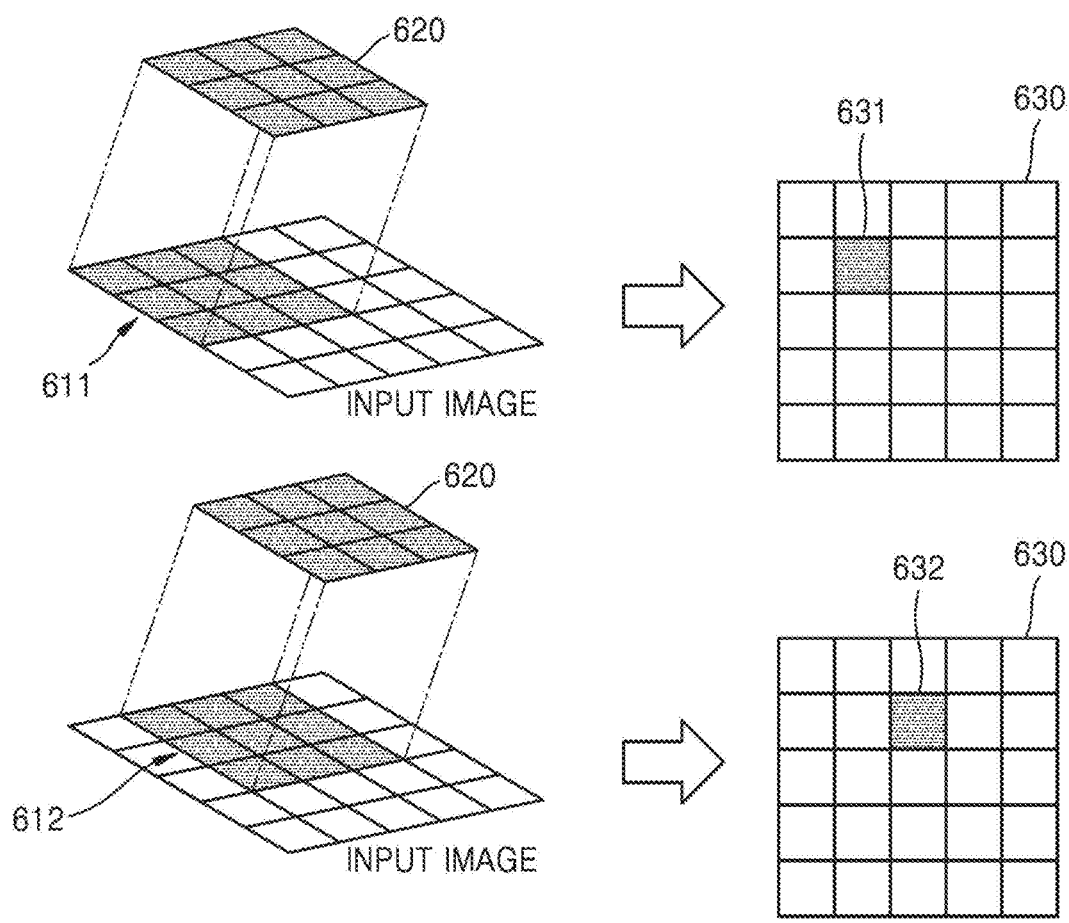
FIG. 6 illustrates a convolution operation performed in a convolutional layer according to an embodiment of the disclosure.

FIG. 6 illustrates a convolution operation performed in a convolutional layer according to an embodiment of the disclosure.

FIG. 6 illustrates a process of generating a feature map 630 through a convolution operation between an input image 510 and a kernel 620 included in the kernel group 520, according to an embodiment of the disclosure. For example, the kernel 620 may be one of the kernels 520-1, 520-2, . . . , 520-n referred to in FIG. 5A or 5B, and the feature map 630 among the feature maps 530 may correspond to the kernel 620.

Referring to FIG. 6, for convenience of descriptions, it is assumed that the input image 510 has a size of 5×5 and the number of channels is 1. It is also assumed that one kernel included in the kernel group 520 applied to the input image 510 has a size of 3×3 and the number of channels, Cin, is 1.

Referring to FIG. 6, a process of extracting a feature of the input image 510 by applying the kernel 620 from a top left end to a bottom right end of the input image 510 is shown. The kernel 620 has a size of 3×3 and the number of channels is 1. For example, a convolution operation may be performed by applying the kernel 620 to pixels included in a top left 3×3 region 611 of the input image 510.

For example, by multiplying pixel values included in the top left 3×3 region 611 and parameter values included in the kernel 620 and summing multiplication results, one pixel value 631 mapped to the top left 3×3 region 611 may be generated.

By multiplying pixel values included in a 3×3 region 612 moved by one pixel to the right from the top left 3×3 region 611 of the input image 510 and the parameter values included in the kernel 620 and summing multiplication results, one pixel value 632 mapped to the 3×3 region 612 may be generated.

In the same manner, while sliding the kernel 620 from left to right and from top to bottom pixel-by-pixel in the input image 510, the parameter values included in the kernel 620 and the pixel values of the input image 510 are multiplied and multiplication results are summed, thereby generating pixel values of the feature map 630. Data that is subject to a convolution operation may be sampled by moving pixel-by-pixel, but sampling may also be performed by moving by two or more pixels. In a sampling process, a size of an interval between sampled pixels is referred to as a stride, and the size of the feature map 630 to be output may be determined according to the size of the stride. As shown in FIG. 6, to make the size of the feature map 630 be equal to that of the input image 510, padding may be performed. Padding may mean increasing the size of the input image 510 by adding a specific value (e.g., '0') to an edge of the input image 510 to prevent an output of the feature map 530 with a decreased size. When a convolution operation is performed after padding is performed, the size of the feature map 630 may be equal to the size of the input image 510. However, the disclosure is not limited thereto.

Meanwhile, a convolution operation result (e.g., the feature map 630) for the kernel 620 is shown in FIG. 6, but when convolution operations are performed for $C_{out}$ kernels, feature maps including $C_{out}$ channel images may be output. For example, the number of channels of the feature map 530 may be determined according to the number of kernels included in the kernel group 520.

According to an embodiment of the disclosure, the feature map 630 may be generated from the input image 510 through a dilated convolution operation according to a dilation rate of a kernel group. The dilated convolution operation will be described with reference to FIG. 7.

Figure 7:
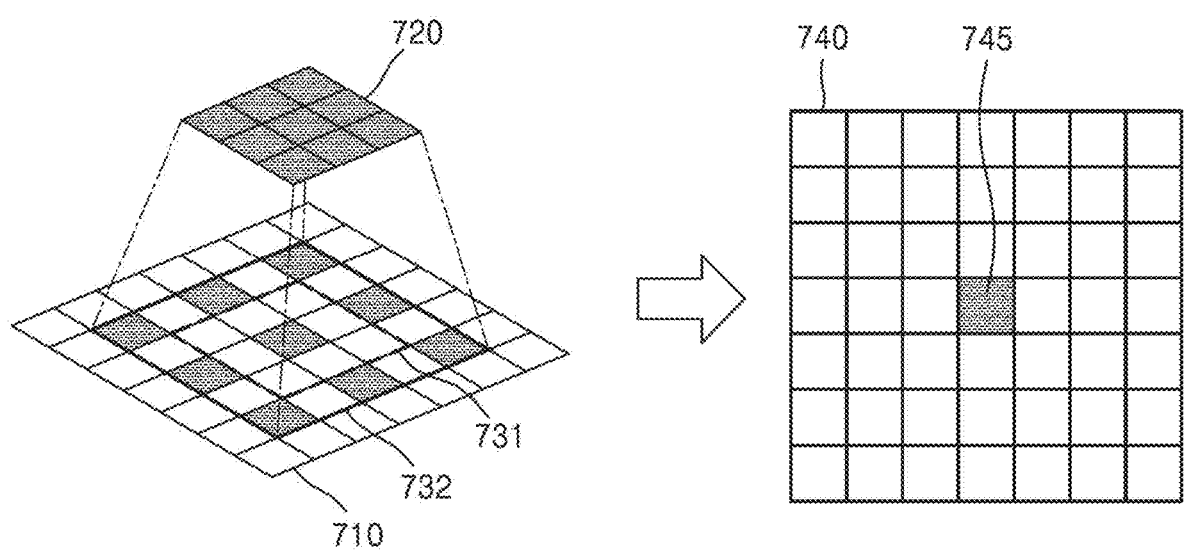
FIG. 7 is a diagram referred to for illustrating dilated convolution according to an embodiment of the disclosure.

FIG. 7 illustrates dilated convolution according to an embodiment of the disclosure.

Referring to FIG. 7, for convenience of descriptions, it is assumed that an input image 710 that is input to a dilated convolution operation has a size of 7×7 and a size of a kernel 720 is 3×3.

For a general convolution operation, the kernel 720 may be applied to a region having a size of 3×3 of the input image 710. For example, by multiplying pixel values included in a first region 731 having a size of 3×3 of the input image 710 and 3×3 parameter values included in the kernel 720 and summing multiplication results, a value of one pixel 745 of an output image 740 may be generated.

Figure 10:
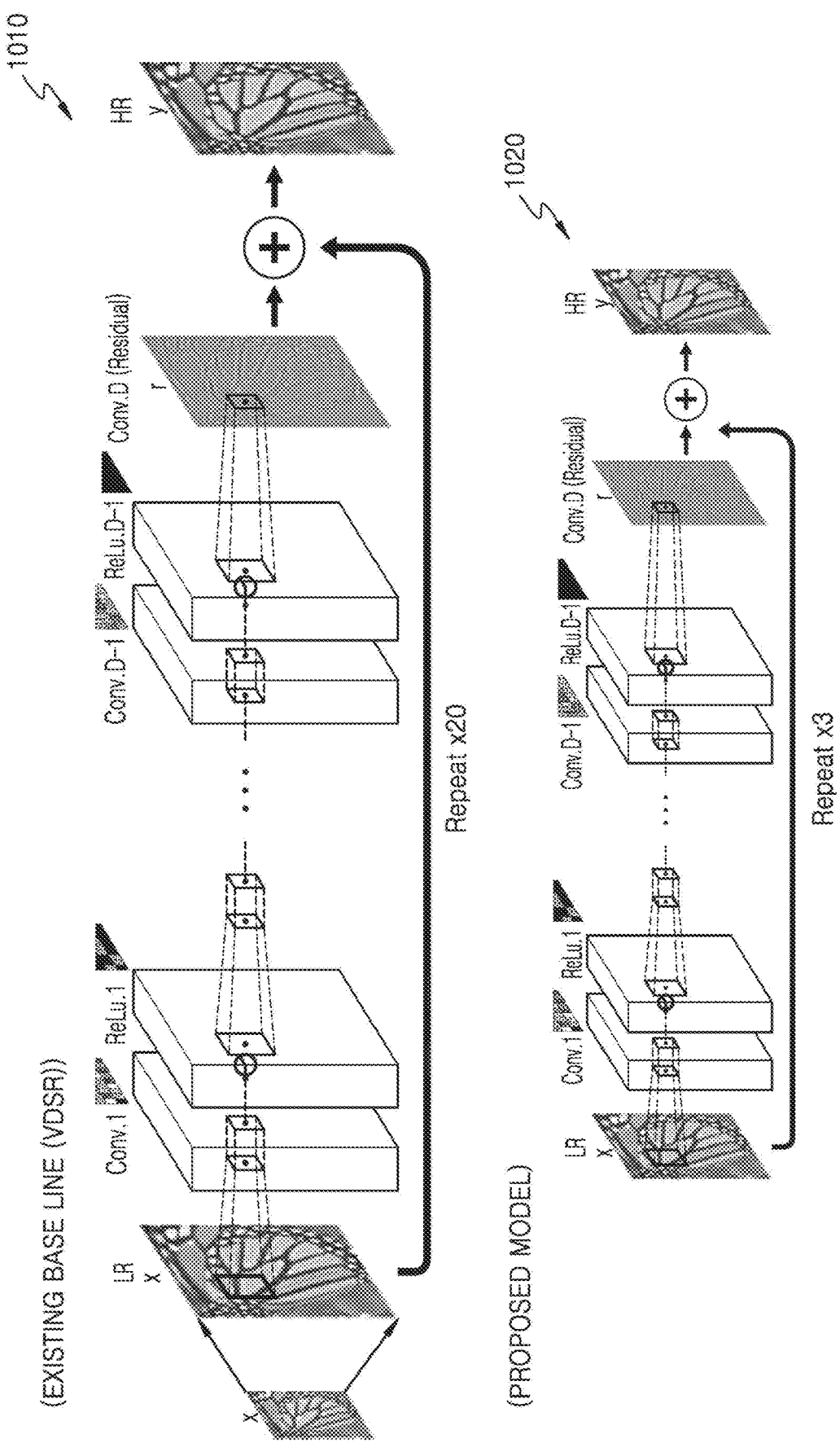
FIG. 10 is a diagram referred to for comparing an image processing network according to an embodiment of the disclosure.

On the other hand, for a dilated convolution operation, the size of a region to which the kernel 720 is applied may be dilated according to a dilation rate. For a dilation rate of 2, the size of the region to which the kernel 720 is applied may be dilated from 3×3 to 5×5. For example, as shown in FIG. 10, the kernel 720 may be applied to a second region 732 having a size of 5×5. In this case, by multiplying nine parameter values included in the kernel 720 to each of values of first to ninth pixels (shaded pixels) included in the second region 732 and summing multiplication results, the value of the pixel 745 of the output image 740 may be generated.

According to an embodiment of the disclosure, when a general convolution operation is performed, to extract a feature of a 5×5 region of an input image, an operation (i.e., an operation of 25 parameter values) with the kernel 720 having a size of 5×5 is required, but when a dilated convolution operation is performed, a feature of a 5×5 region of an input image may be extracted with the kernel 720 having a dilation rate of 2 and a size of 3×3. Therefore, the amount of computations may be maintained while using the kernel 720 having the same size of 3×3, but the size of the region of the input image from which the feature may be extracted may increase.

According to an embodiment of the disclosure, when a feature map is generated with a dilated convolution operation, a feature of a wider region may be extracted according to a dilation rate, but much missing information may exist therein. According to an embodiment of the disclosure, when feature maps generated with the kernels 720 having different dilation rates are summed, a combination map may be generated by combining results of the feature maps with extracted features of various regions of an input image.

Referring back to FIGS. 5A and 5B, the feature map generation unit 210 according to an embodiment of the disclosure may generate the feature map 530 by performing a dilated convolution operation between the input image 510 and the kernel group 520.

Figure 8:
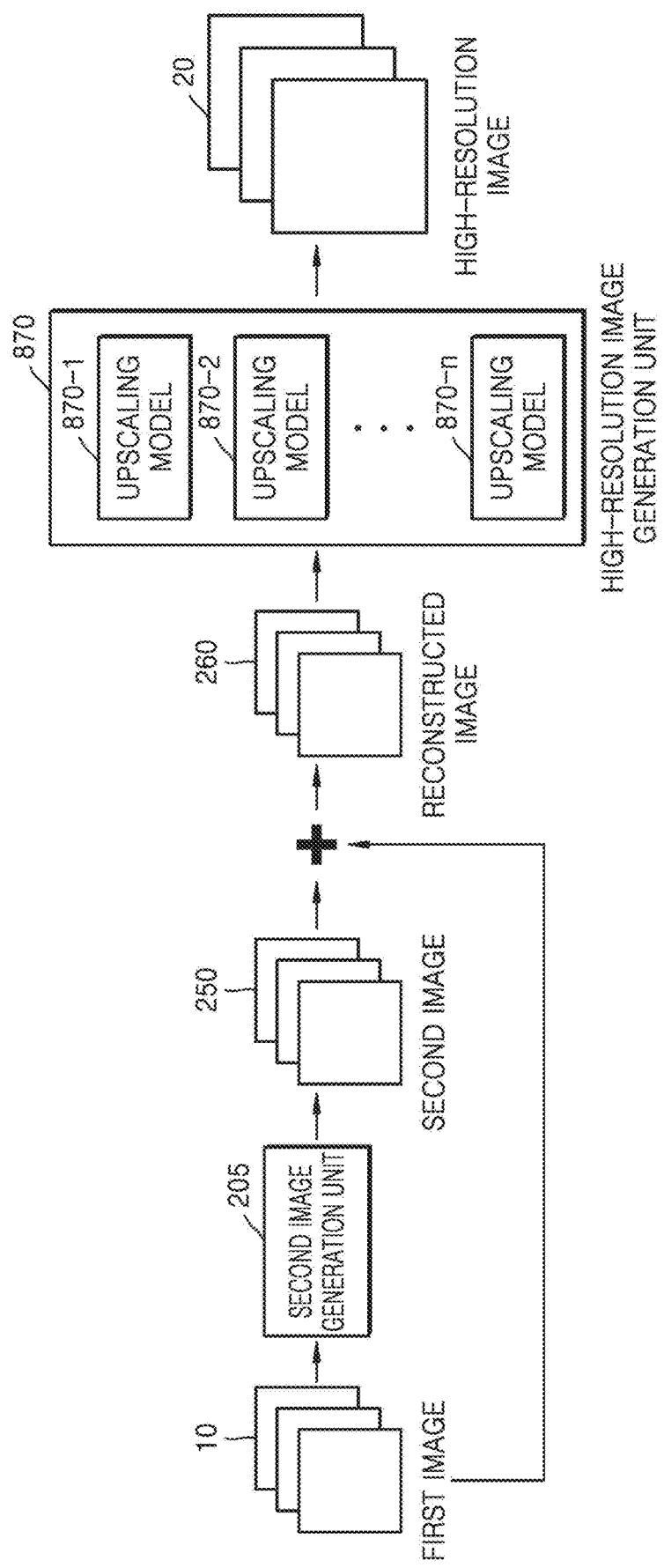
FIG. 8 is a flowchart of a method of generating a high-resolution image, according to an embodiment of the disclosure.

FIG. 8 is a diagram of a method of generating a high-resolution image according to an embodiment of the disclosure.

Referring to FIG. 8, according to an embodiment of the disclosure, the image processing apparatus 100 may generate the high-resolution image 20 by inputting the reconstructed image 260 to a high-resolution image generation unit 870. The high-resolution image generation unit 870 may be the high-resolution image generation unit 270 of FIG. 2.

According to an embodiment of the disclosure, the high-resolution image generation unit 870 may include at least one upscaling model 970-1, 970-2, . . . , 970-n. Each upscaling model may include a different upscaling coefficient. For example, a first upscaling model 970-1 may generate the high-resolution image 20 by ×2 upscaling the reconstructed image 260, and a second upscaling model 970-2 may generate the high-resolution image 20 by three-times (×3) upscaling the reconstructed image 260.

According to an embodiment of the disclosure, when the reconstructed image 260 has a width of W and a height of H, the reconstructed image 260 may be input to an x-times (×k) upscaling model, thereby generating the high-resolution image 20 having a width of kW and a height of kH.

According to an embodiment of the disclosure, the image processing apparatus 100 may identify an upscaling coefficient and input the reconstructed image 260 to an upscaling model corresponding to the identified upscaling coefficient, thereby generating the high-resolution image 20. For example, when the upscaling coefficient is set to four times (×4), the image processing apparatus 100 may identify the upscaling coefficient as 4 and input the reconstructed image 260 to an upscaling model with an upscaling coefficient of 4, thereby generating the high-resolution image 20.

Figure 9:
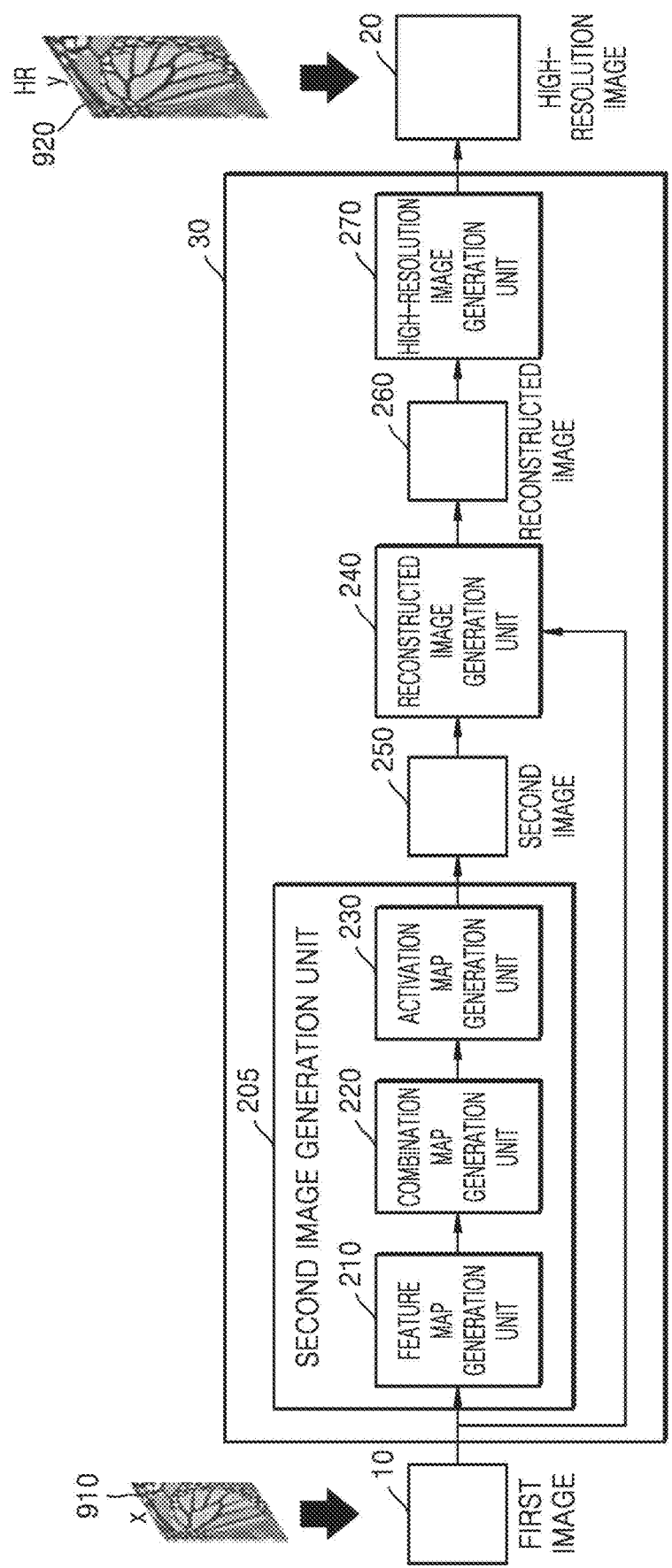
FIG. 9 is a diagram illustrating a learning method of an image processing network according to an embodiment of the disclosure.

FIG. 9 illustrates a learning method of an image processing network according to an embodiment of the disclosure.

Referring to FIG. 9, according to an embodiment of the disclosure, the image processing network 30 may learn by using training data (a training image pair) including a low-resolution image 910 and a high-resolution image 920 thereof. According to an embodiment of the disclosure, the low-resolution image 910 of the training data may be obtained by compressing the high-resolution image 920.

According to an embodiment of the disclosure, when the image processing network 30 is trained using the training data, parameter values of at least one of the feature map generation unit 210, the combination map generation unit 220, the activation map generation unit 230, or the high-resolution image generation unit 270 may be determined.

According to an embodiment of the disclosure, when the image processing network 30 is trained using the training data, a parameter for weighted-summing feature maps in the combination map generation unit 220 may be trained.

FIG. 10 is a diagram referred to for comparing an image processing network according to an embodiment of the disclosure.

Referring to FIG. 10, an accurate image super-resolution using very deep convolutional networks (VDSR) model 1010 and a model 1020 according to an embodiment of the disclosure will be compared to each other using an existing image processing method of a super-resolution algorithm.

The VDSR model 1010 is a super-resolution algorithm image processing method using a deep layer. Comparison will be made between a case where the VDSR model 1010 is designed as a 20-layer VDSR model and a case where a model 1020 according to an embodiment of the disclosure is designed as a 3-layer model.

In an example test for comparison, the 20-layer VDSR model 1010 and the 3-layer model 1020 according to an embodiment of the disclosure are trained with the same data set. The data set includes lossless image-compressed image pairs.

A result of comparing the speed of the 20-layer VDSR model 1010 with the speed of the 3-layer model 1020 according to an embodiment of the disclosure is as provided below. For WQHD (2560×1440) image inference, the 20-layer VDSR model 1010 takes about 1 second in average, whereas the 3-layer model 1020 according to an embodiment of the disclosure takes about 28 ms. A speed improvement of about 35 times may be achieved. The speed improvement is required for real-time image processing, and thus the 3-layer model 1020 according to an embodiment of the disclosure may be used in a high-quality streaming service, or the like, that may not be performed before with the related art. Image processing, such as super resolution, has a high input resolution. Recently, for 4K and 8K images, nHD (640×360) and HD (1280×720) images are often input. With a size increase in an input image, the amount of computations also increases, reducing a processing speed. Therefore, reduction in the amount of computations in such super-resolution processing may be helpful in commercializing providing of real-time.

A result of comparing an image quality of the 20-layer VDSR model 1010 with an image quality of the 3-layer model 1020 according to an embodiment of the disclosure is as provided below. The image quality comparison is made based on a peak signal-to-noise ratio (PSNR) and a structural similarity index map (SSIM).

TABLE 1

|  | PSNR | SSIM |
| --- | --- | --- |
| 3-layer model 1020 according to an embodiment of the disclosure | 28.12 | 0.8012 |
| 20-layer VDSR model 1010 | 28.21 | 0.80 |

According to Table 1, results of PSNR and SSIM comparisons between the 3-layer model 1020 according to an embodiment of the disclosure and the 20-layer VDSR model 1010 are similar to each other. For example, the 3-layer model 1020 according to an embodiment of the disclosure has several tens of times higher speed than the 20-layer VDSR model 1010 while having an image quality of a similar level. This result is not limited to the 3-layer used in the test, and may appear the same in layers of various depths.

Figure 11:
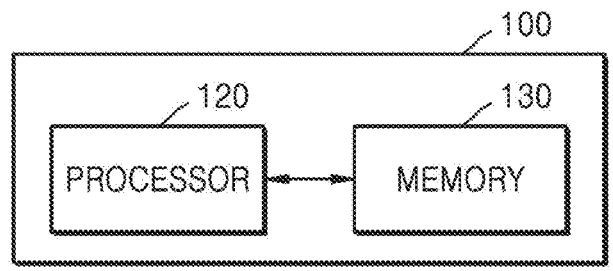
FIG. 11 is a block diagram illustrating a structure of an image processing apparatus according to an embodiment of the disclosure.

FIG. 11 is a block diagram showing a structure of an image processing apparatus according to an embodiment of the disclosure.

Referring to FIG. 11, the image processing apparatus 100 according to an embodiment of the disclosure includes a processor 120 and a memory 130.

The processor 120 according to an embodiment of the disclosure may control in overall the image processing apparatus 100. The processor 120 according to an embodiment of the disclosure may execute one or more programs stored in the memory 130.

The memory 130 according to an embodiment of the disclosure may store various data, programs, or applications for driving and controlling the image processing apparatus 100. The programs stored in the memory 130 may include one or more instructions. The programs (for example, one or more instructions) or applications stored in the memory 130 may be executed by the processor 120.

The processor 120 according to an embodiment of the disclosure may include at least one of a central processing unit (CPU), a graphic processing unit (GPU), or a video processing unit (VPU). Alternatively, depending on an embodiment of the disclosure, the processor 120 may be implemented in the form of a system-on-chip (SoC) in which at least one of a CPU, a GPU, or a VPU is integrated. Alternatively, the processor 120 may further include a neural processing unit (NPU).

The processor 120 according to an embodiment of the disclosure may generate an output image corresponding to a high-resolution image of an input image by using the image processing network 30. For example, the processor 120 may perform at least one of operations of the feature map generation unit 210, the combination map generation unit 220, the activation map generation unit 230, the reconstructed image generation unit 240, and the high-resolution image generation unit 270 shown in and described with reference to FIGS. 2 to 4, 5A, 5B, and 6 to 10.

The processor 120 may generate a feature map of the first image or the input image. According to an embodiment of the disclosure, the feature map of the first image or the input image may be generated using kernel groups having different dilation rates. For example, the first feature map may be generated by performing a convolution operation between the input image or the first image and the first kernel group having a dilation rate of 1, and the second feature map may be generated by performing a convolution operation between the first image or the input image and the second kernel group having a dilation rate of 2. According to an embodiment of the disclosure, there are three or more kernel groups having different dilation rates. A method of generating the feature map of the first image is described above with reference to FIGS. 2, 4, 5A, and 5B, and a method of performing a convolution operation between the first image or the input image and a kernel group having a different dilation rate is described with reference to FIGS. 6 and 7, and thus will not be described at this time.

The processor 120 may generate a combination map based on the feature map. For example, when a first feature map is generated by a convolution operation with a kernel group having a dilation rate of 1 and a second feature map is generated by a convolution operation with a kernel group having a dilation rate of 2, the processor 120 may generate a first combination map identically to the first feature map and generate a second combination map by summing the first feature map and the second feature map. A method of generating the combination map based on the feature map is described above with reference to FIGS. 5A and 5B, and thus will not be described at this time.

The processor 120 may generate an activation map based on the combination map. For example, the processor 120 may generate the activation map by inputting the combination map to an activation function. According to an embodiment of the disclosure, the processor 120 may generate the feature map or generate the activation map as a second image, by performing a convolution operation between the activation map and a kernel group. A method of generating the activation map based on the combination map is described above with reference to FIGS. 5A and 5B, and thus will not be described at this time.

The processor 120 may generate the feature map of the input image by performing a convolution operation between the input image that is the activation map and the kernel group. For example, the processor 120 may generate a first feature map by performing a convolution operation between the activation map and a first kernel group having a dilation rate of 1 and generate a second feature map by performing a convolution operation between the activation map and a second kernel group having a dilation rate of 2. The processor 120 may generate the combination map by using the feature map generated from the activation map and generate the activation map with the generated combination map. This method is described above with reference to FIG. 4 and thus will not be described at this time.

The processor 120 may generate a reconstructed image based on the first image and the second image. For example, the processor 120 may generate the reconstructed image by summing the first image and the second image. A method of generating the reconstructed image is described above with reference to FIG. 4 and thus will not be described.

The processor 120 may generate a high-resolution image by inputting the reconstructed image to an upscaling model. According to an embodiment of the disclosure, the processor 120 may identify an upscaling coefficient and input the reconstructed image to an upscaling model corresponding to the identified upscaling coefficient, thereby generating the high-resolution image. A method of generating the high-resolution image is described above with reference to FIG. 9 and thus will not be described.

The processor 120 may train an image processing network by using training data including a high-resolution image and a low-resolution image. For example, the processor 120 may learn for at least one of a parameter of a kernel, a weight value parameter regarding combination map generation, or a parameter of an upscaling model, by using the training data. A method of training the image processing network is described above with reference to FIG. 10 and thus will not be described.

Meanwhile, the image processing network 30 according to an embodiment of the disclosure may be a network trained by a server or an external device. The external device may train the image processing network 30 based on the training data. The training data may include a plurality of data sets including image data including noise and noise-removed image data having edge characteristics or texture characteristics preserved.

The server or the external device may determine parameter values included in kernels used in each of a plurality of convolutional layers included in the image processing network 30. For example, the server or the external device may determine parameter values to minimize a difference (loss information) between a high-resolution image and a low-resolution image (training data) generated by compressing the high-resolution image through the image processing network 30.

The image processing apparatus 100 according to an embodiment of the disclosure may receive the image processing network 30 completed training from the server or the external device and store the same in the memory 130. For example, the memory 130 may store a structure and parameter values of the image processing network 30 according to an embodiment of the disclosure, and the processor 120 may generate a high-resolution image from the first image according to an embodiment of the disclosure by using parameter values stored in the memory 130.

Meanwhile, the block diagram of the image processing apparatus 100 shown in FIG. 11 may be a block diagram for an embodiment of the disclosure. Each component of the block diagram may be integrated, added, or omitted depending on the specifications of the image processing apparatus 100 implemented actually. For example, when necessary, two or more components may be integrated into one component or one component may be divided into two or more components. A function executed in each block is intended to describe embodiments of the disclosure, and a detailed operation or apparatus thereof does not limit the scope of the disclosure.

The method of the image processing apparatus according to an embodiment of the disclosure may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the disclosure or a program command known to be used by those skilled in the art of the computer software field. Examples of the computer-readable recording medium may include magnetic media, such as a hard disk, a floppy disk, and a magnetic tape, optical media, such as a compact disk read only memory (CD-ROM) and a digital versatile disk (DVD), a magneto-optical media, such as a floptical disk, and a hardware device especially configured to store and execute a program command, such as a read only memory (ROM), a random access memory (RAM), a flash memory, or the like. Examples of the program command may include not only a machine language code created by a complier, but also a high-level language code executable by a computer using an interpreter.

The image processing apparatus and a method thereof according to the disclosed embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer, the electronic market, or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include a S/W program itself, which is transmitted from the server to the client device or the third device or transmitted from the third device to the client device.

In this case, one of the server, the client device, and the third device may execute the computer program product to perform the method according to the disclosed embodiments of the disclosure. Alternatively, two or more of the server, the client device, and the third device may execute the computer program product to execute the method according to the disclosed embodiments of the disclosure in a distributed manner.

For example, a server (e.g., a cloud server or AI server, or the like) may execute a computer program product stored in the server to control the client device communicating with the server to perform the method according to the disclosed embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating an image processing apparatus, the method comprising:
generating a first feature map by performing a convolution operation between a first image and a first kernel group;
generating a second feature map by performing a convolution operation between the first image and a second kernel group;
generating a combination map by summing the first feature map and the second feature map;
generating a second image based on the first feature map and the combination map; and
generating a reconstructed image of the first image, based on the second image and the first image, and generating a high-resolution image of the first image by inputting the reconstructed image to an upscaling model,
wherein a size of at least one kernel included in the first kernel group and a size of at least one kernel included in the second kernel group are equal to each other,
wherein a dilation rate of the second kernel group is greater than a dilation rate of the first kernel group, and
wherein a number of kernels included in the first kernel group is equal to a number of kernels included in the second kernel group.

2. The method of claim 1,
wherein the size of the at least one kernel included in the first kernel group and the size of the at least one kernel included in the second kernel group are each 3×3.

3. The method of claim 1,
wherein the dilation rate of the first kernel group is 1, and
wherein the dilation rate of the second kernel group is 2.

4. The method of claim 1, wherein the combination map is generated by weighted-summing the first feature map and the second feature map.

5. The method of claim 1, further comprising:
generating a third feature map by performing a convolution operation between the first image and a third kernel group; and
generating a second combination map by summing the second feature map and the third feature map without including the first feature map,
wherein the generating of the second image comprises generating the second image based on the first feature map, the combination map, and the second combination map.

6. The method of claim 1,
wherein the second image is generated by inputting the first feature map and the combination map to an activation function, and
wherein the activation function comprises at least one of a rectified linear unit (ReLU) function, a sigmoid function, a Tanh function, or an exponential linear unit (ELU) function.

7. The method of claim 1, wherein the generating of the second image comprises:
generating a first activation map based on the first feature map and the combination map;
generating a fourth feature map by performing a convolution operation between the first activation map and a fourth kernel group;
generating a fifth feature map by performing a convolution operation between the first activation map and a fifth kernel group;
generating a fourth combination map based on the fourth feature map;
generating a fifth combination map based on the fourth feature map and the fifth feature map; and
generating the second image based on the fourth combination map and the fifth combination map,
wherein a size of at least one kernel included in the fourth kernel group and a size of at least one kernel included in the fifth kernel group are equal to each other, and
wherein a dilation rate of the fifth kernel group is greater than a dilation rate of the fourth kernel group.

8. The method of claim 7,
wherein the second image is generated by inputting the fourth combination map and the fifth combination map to an activation function, and
wherein the activation function comprises at least one of a rectified linear unit (ReLU) function, a sigmoid function, a Tanh function, or an exponential linear unit (ELU) function.

9. The method of claim 1, wherein the generating of the high-resolution image of the first image comprises:
identifying an upscaling coefficient of the first image; and
generating the high-resolution image of the first image by inputting the reconstructed image of the first image to the upscaling model corresponding to the identified upscaling coefficient among a plurality of upscaling models.

10. The method of claim 1, wherein at least one of the first kernel group, the second kernel group, or the upscaling model is trained using a training data set comprising low-resolution images and high-resolution images respectively corresponding to the low-resolution images.

11. An image processing apparatus comprising:
at least one processor including processing circuitry; and
memory storing at least one instruction that, when executed by the at least one processor individually or collectively, cause the image processing apparatus to:
generate a first feature map by performing a convolution operation between a first image and a first kernel group,
generate a second feature map by performing a convolution operation between the first image and a second kernel group,
generate a combination map by summing the first feature map and the second feature map,
generate a second image based on the first feature map and the combination map, and
generate a reconstructed image of the first image, based on the second image and the first image, and generate a high-resolution image of the first image by inputting the reconstructed image to an upscaling model,
wherein a size of at least one kernel included in the first kernel group and a size of at least one kernel included in the second kernel group are equal to each other,
wherein a dilation rate of the second kernel group is greater than a dilation rate of the first kernel group, and
wherein a number of kernels included in the first kernel group is equal to a number of kernels included in the second kernel group.

12. The image processing apparatus of claim 11,
wherein the size of the at least one kernel included in the first kernel group and the size of the at least one kernel included in the second kernel group are each 3×3.

13. The image processing apparatus of claim 11,
wherein the dilation rate of the first kernel group is 1, and
wherein the dilation rate of the second kernel group is 2.

14. The image processing apparatus of claim 11, wherein the combination map is generated by weighted-summing the first feature map and the second feature map.

15. The image processing apparatus of claim 11, wherein the at least one instruction that, when executed by the at least one processor individually or collectively, cause the image processing apparatus to:
generate a third feature map by performing a convolution operation between the first image and a third kernel group,
generate a second combination map by summing the second feature map and the third feature map without including the first feature map, and
generate the second image based on the first feature map, the combination map, and the second combination map.

16. The image processing apparatus of claim 11,
wherein the second image is generated by inputting the first feature map and the combination map to an activation function, and
wherein the activation function comprises at least one of a rectified linear unit (ReLU) function, a sigmoid function, a Tanh function, or an exponential linear unit (ELU) function.

17. The image processing apparatus of claim 11, wherein to at least one instruction that, when executed by the at least one processor individually or collectively, cause the image processing apparatus to:
generate a first activation map based on the first feature map and the combination map,
generate a fourth feature map by performing a convolution operation between the first activation map and a fourth kernel group,
generate a fifth feature map by performing a convolution operation between the first activation map and a fifth kernel group,
generate a fourth combination map based on the fourth feature map,
generate a fifth combination map based on the fourth feature map and the fifth feature map, and
generate the second image based on the fourth combination map and the fifth combination map,
wherein a size of at least one kernel included in the fourth kernel group and a size of at least one kernel included in the fifth kernel group are equal to each other, and
wherein a dilation rate of the fifth kernel group is greater than a dilation rate of the fourth kernel group.

18. The image processing apparatus of claim 17,
wherein the second image is generated by inputting the fourth combination map and the fifth combination map to an activation function, and
wherein the activation function comprises at least one of a rectified linear unit (ReLU) function, a sigmoid function, a Tanh function, or an exponential linear unit (ELU) function.

19. The image processing apparatus of claim 11, wherein at least one instruction that, when executed by the at least one processor individually or collectively, cause the image processing apparatus to:
identify an upscaling coefficient of the first image, and
generate the high-resolution image of the first image by inputting the reconstructed image of the first image to the upscaling model corresponding to the identified upscaling coefficient among a plurality of upscaling models.

20. At least one non-transitory computer-readable recording media having recorded thereon a program for executing the method of claim 1.

* * * * *